United States Patent [19]
Martz

[11] Patent Number: 5,986,673
[45] Date of Patent: Nov. 16, 1999

[54] METHOD FOR RELATIONAL ORDERING AND DISPLAYING MULTIDIMENSIONAL DATA

[76] Inventor: David R. Martz, 7051 Natal Dr. #36, Westminster, Calif. 92683

[21] Appl. No.: 08/953,678

[22] Filed: Oct. 17, 1997

[51] Int. Cl.⁶ .................................................. G06F 15/00
[52] U.S. Cl. ........................................... 345/437; 345/440
[58] Field of Search ..................................... 345/440, 437

[56] References Cited

U.S. PATENT DOCUMENTS 5,664,083  9/1997  Takeuchi et al. ....................... 345/437

Primary Examiner—Mark K. Zimmerman
Assistant Examiner—Motilewa Good-Johnson
Attorney, Agent, or Firm—Dennis W. Beech

[57] ABSTRACT

This method of relationally ordering object attributes provides for data display and analysis of information in a two dimensional or three dimensional format. The ordering and annotating of the data as it is processed allows for display of relative similarity and difference in a more than two or three parameters format as compared to that normally found in object cluster analysis. This allows for display analysis of objects using multiple parameters to obtain a measure of attribute relativity for diagnosis of object condition.

8 Claims, 12 Drawing Sheets

| Company | Sales Trail 12 Mo | Gross Income | Cash | Accounts Receivables | Inventories | Total Assets | Debt Due 1-Yr Out | Accounts Payable | Long-Term Debt | Capital Spending | % SG&A to Sales | 5-Year Sales Growth | Industry Rank |
|---|---|---|---|---|---|---|---|---|---|---|---|---|---|
| Honda Motor ADR | 43712 | 11989 | 2795 | 3157 | 4573 | 32860 | 5236 | 4557 | 6135 | 1406 | 23 | 8 | 61 |
| Du Pont | 43810 | 18666 | 1319 | 5193 | 3706 | 37987 | 3910 | 2757 | 5087 | 3303 | 6 | 2 | 83 |
| Texaco Inc | 44648 | 4252 | 536 | 4177 | 1357 | 24937 | 737 | 3777 | 5503 | 2386 | 4 | -1 | 49 |
| Sony Corp ADR | 45171 | 12616 | 4863 | 7988 | 8006 | 47156 | 3983 | 9193 | 11248 | 2337 | 21 | 13 | 80 |
| Gen'l Electric | 46119 | 14735 | 974 | 8826 | 4473 | 59925 | 2339 | 4195 | 1710 | 2389 | 13 | 1 | 47 |
| AT&T Corp | 52184 | 26336 | 134 | 16060 | | 55552 | 2460 | 6173 | 7883 | 6339 | 28 | 2 | 87 |
| Unilever PLC ADR | 52846 | 22255 | 2302 | 7302 | 6635 | 42903 | 1832 | 4878 | 3391 | 1907 | 33 | 5 | 62 |
| Unilever NV (NY Shs) | 52846 | 22255 | 2302 | 7302 | 6635 | 42903 | 1832 | 4878 | 3391 | 1907 | 33 | 5 | 62 |
| Chrysler | 61397 | 11891 | 8125 | 2003 | 4448 | 53756 | 4335 | 8290 | 9858 | 4109 | 7 | -1 | 61 |
| Matsushita Elec | 64739 | 22456 | 18199 | 11824 | 9475 | 74876 | 8637 | 5326 | 9524 | 3550 | 27 | 10 | 80 |
| Philip Morris | 69204 | 27534 | 1138 | 4508 | 7862 | 53811 | 2048 | 3364 | 12324 | 1621 | 23 | 10 | 46 |
| British Petroleum PLC | 69780 | 15674 | 617 | 10193 | 4390 | 51601 | 1151 | 6555 | 7256 | 4509 | 10 | 1 | 49 |
| Mobil Corp | 73193 | 12764 | 498 | 7316 | 3287 | 42138 | 2127 | 5358 | 4629 | 4268 | 9 | 3 | 49 |
| Int'l Business Mach | 75947 | 35551 | 8137 | 23167 | 5870 | 81132 | 12957 | 4767 | 9872 | 5883 | 28 | 2 | 10 |
| Wal-Mart Stores | 104859 | 20367 | 83 | 853 | 15989 | 37541 | 2798 | 6442 | 10600 | 3566 | 15 | 25 | 55 |
| Ford Motor | 118023 | 41185 | 19649 | 153015 | 7162 | 243283 | 87947 | 18712 | 70374 | 8997 | 8 | 3 | 61 |
| Exxon Corp | 122431 | 22906 | 1789 | 8925 | 5681 | 91296 | 2247 | 14113 | 7778 | 7128 | 7 | 3 | 49 |
| Royal Dutch Pet | 128313 | 33033 | 11356 | 20033 | 7559 | 117602 | 5433 | 16826 | 7349 | 10965 | 12 | 1 | 49 |
| Shell Transport | 128313 | 33033 | 11356 | 20033 | 7559 | 117602 | 5433 | 16826 | 7349 | 10965 | 12 | 1 | 49 |
| Gen'l Motors | 152346 | 42293 | 16642 | 68710 | 11529 | 217123 | 46648 | 11898 | 36674 | 6351 | 8 | .5000 | 61 |
| FACTOR WEIGHT | 7 | 5 | 5 | 5 | 5 | 5 | 5 | 5 | 5 | 2 | 1 | 3 | 4 |

Figure 1

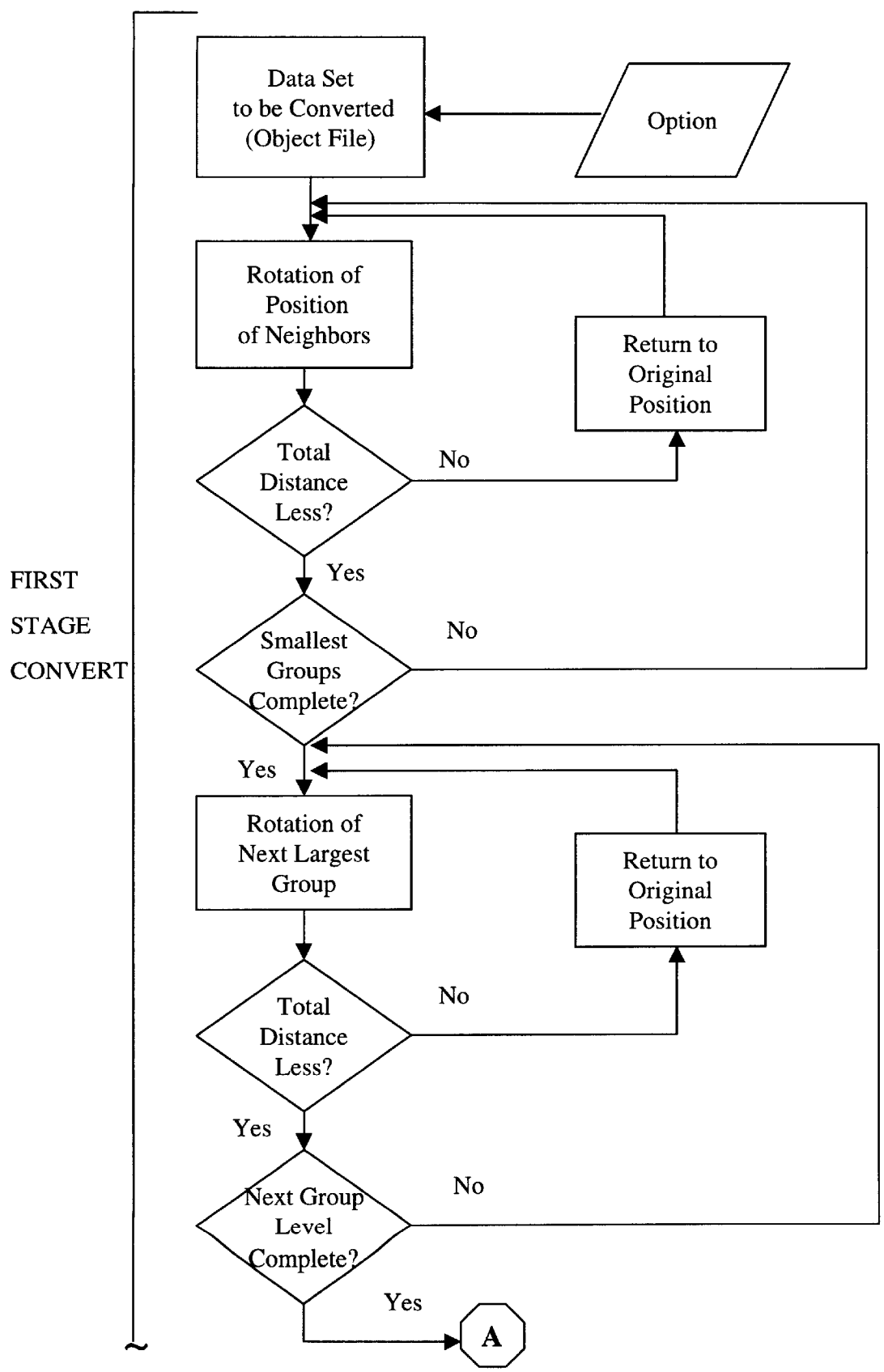
Figure 11-A

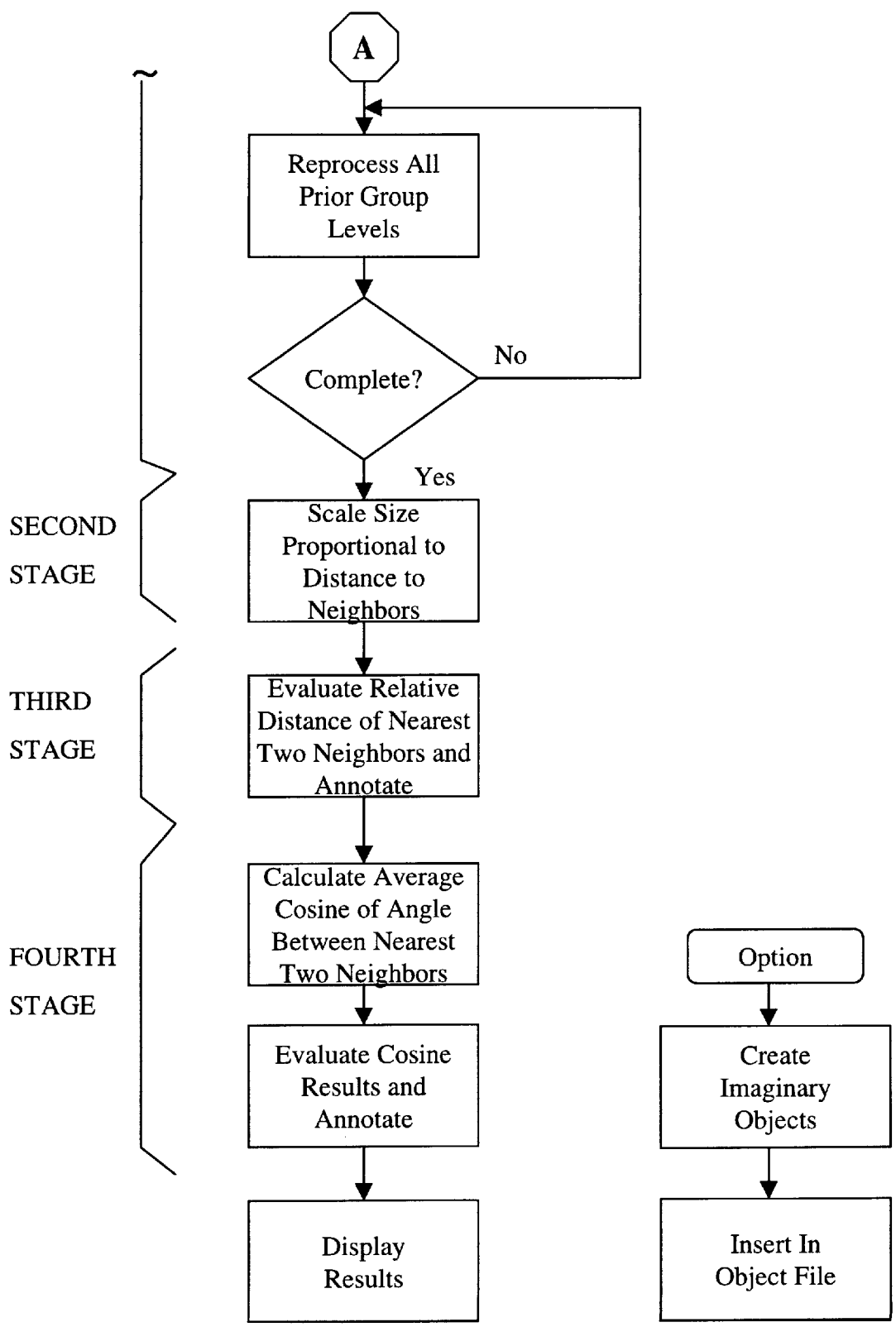
Figure 11-B

METHOD FOR RELATIONAL ORDERING AND DISPLAYING MULTIDIMENSIONAL DATA

BACKGROUND OF THE INVENTION

1. Field of the Invention

The subject of this invention is information cartography. The new process transforms relational data for display as a map, projection, or three-dimensional shape bearing characteristics like those of a typical, topographic diagram.

2. Description of the Related Art

The rendering of multidimensional data is currently performed by the statistical techniques of cluster analysis and multidimensional scaling (MDS). These aspects of the related art are discussed herein, along with an overview of the relational database technology that serves as a source for the data to be transformed.

Cluster analyses is an established method for the attribute based classification of objects. Its purpose is to organize large volumes of data into meaningful groups. An example of the data that might be used in cluster analysis is shown in FIG. 1. This Figure depicts a number of large, publicly held companies along with some financial data from 1996. The decimal numbers have been truncated for convenience. While all of the data that is needed to compare the companies is shown in the table, time consuming study of the numbers is required to answer questions such as which companies have similar financial structures, which are very different from each other, or which are larger or smaller. Cluster analysis seeks to answer these questions, concerning the relationships between the objects, by converting the printed numbers into a more meaningful graphical representation.

In cluster analysis, each column of data is considered to be a dimension, in the mathematical sense. Thus, for example, we could take the first three columns, Sales for the trailing 12 months, Gross Income for the Year, and Available Cash and assign them to the X, Y, and Z axes of a three dimensional plot. Each company would be represented by a single point on this plot. DuPont, for example would be located at 43810, 18666, 1319. Even though we cannot imagine it, we can mathematically treat all of the other columns as additional dimensions. Each company, each object, is located at one particular point in this multidimensional attribute space.

Cluster analysis is concerned with the locations of the objects in attribute space. It creates clustering diagrams, called dendrograms, that show which objects are close together and which objects are farther from one another.

The process of cluster analysis begins by standardizing the data in each column. This step is optional, but in practice is almost always employed. As well described in the literature, each value is scaled relative to the average value in the column, and divided by the standard deviation of the entire column. This reduces all of the data in all columns to a standard range of values, so no column of data gets an unfair influence on the final analysis. In the example above, the % SG&A, i.e., selling, General, and Administrative Costs, to Sales data can have a maximum value of 99.9, whereas the Sales data can range into the millions. If the information were not standardized, the trivial magnitude of % SG&A to Sales would be swamped by the larger numbers.

The current art includes other methods for standardization of data, each applicable to specific situations. The literature describes methods for dealing with proportional data, boolean data, and outliers. The invention described herein works with all of these methods.

Next, if the user of the technique has so chosen, the data columns are given weights to deliberately control their outcome on the final analysis. To a stock analyst, the %SG&A to Sales number is an important indicator of efficiency, but it is not as valuable in assessing a company as the Sales for the prior 12 months. Thus, the investigator defines a set of weights for the columns. Each piece of data is then multiplied by the weighting factor for the column. Some example weighting factors for evaluation of a publicly held company are shown on the bottom row of FIG. 1.

As described in the literature, the clustering of objects then begins with a calculation of the distances between each object and every other object. In this respect, the term distance is often the Euclidean distance that is calculated as the square root of the sum of the squared differences between the values. This is the Pythagorean Theorem applied to multidimensional data. Other measures of distance can be applied equally well. The 'city-block' distance, also known as the graph-theoretical distance, for example, is the sum of the distances that must be traveled along each dimensional axis to travel from one object to the other. Another measure is the angular separation between the objects, as viewed from the zero point.

Once distances have been calculated, the first cluster is defined as the combination of the two nearest objects or neighbors. These two objects are then replaced by the group they form and combined or averaged attributes are calculated for the group.

There are several ways that this combination can be performed, the most typical being a weighted averaging of the values. Other typical ways are discussed in the literature and include unweighted averaging of the data. Another method does not combine the attributes at all, but simply keeps track of the ranges of their individual values. In this case the subsequent groupings are based upon the nearest, or sometimes furthest, objects in each group rather than average values.

The cluster analysis continues by combining the next closest objects, with the provision that the group that was just created is also available for clustering. Unlike the initial objects which are represented as points in space, as we described above, groups can be represented as an average point or a range of values. This leads to various linking rules for groups. These rules, are discussed in the literature and include nearest neighbors, furthest neighbors, and others.

The analysis continues until all of the objects and groups are clustered into a single, universal group. Unlike many statistical processes however, the appeal of cluster analysis is not held by the final result, but rather by the process used to arrive at it. The complete clustering process is shown on a special figure, known as a cluster diagram, or dendrogram. FIG. 2 illustrates an example dendrogram for the companies based upon the data in FIG. 1.

The dendrogram makes use of nested brackets to graphically illustrate the relationships between objects. The horizontal lines on the far left represent the objects in the analysis, in this case the publicly held companies. Vertical lines that attach two object lines are located at the distance, indicated by the scale at the top, that separates the objects. The other horizontal lines point to groups that are being incorporated into a new group, and their vertical attachment lines show the separation distance between the incorporated objects or groups. The object separation distance is a somewhat arbitrary scale, completely dependent upon the number of attributes analyzed and the weighting factors applied to each. This varies considerably from one model to another. Even with this limitation however, the human eye easily adapts to the interpretation of dendrograms. Small groups of closely related objects are easily discerned, as are specious groupings that fall out in the process of completing the analysis.

A dendrogram of a complex set of data is often full of revelations. In FIG. 2, for example, one can quickly discern financial relationships that can only be discovered through painstaking study of the data in FIG. 1. Mobil and British Petroleum have very similar financial data, while Ford and General Motors stand apart from the pack. Note that the dendrogram itself offers no information as to why these relationships exist. It shows no actual data.

The dendrogram is often used to define categories. To visualize this, imagine cutting the dendrogram in FIG. 2 with a vertical line corresponding to the distance of approximately 11. Any complete group falling just to the left of this line becomes a category; the objects in the group presumably have similar characteristics. If one performed this operation on FIG. 2, it would create several small groups, some individual companies, and one large group containing Texaco, Philip Morris, Chrysler, Sony, British Petroleum, Mobil, and others.

Two other graphical representations are used in the current art to interpret a cluster analysis. The first is a dendrogram of the attributes used in the analysis. This dendrogram can also provide important insights into the data. For example, if we were clustering people based upon their appearance, such as, hair color, height, eye color, etc. we might find a group with blue eyes whose ancestors came from Northern Europe. By looking at the dendrogram of characteristics we might note a close association between blonde hair and blue eyes and conclude that we had found a group representing the stereotypical 'Aryan' race. However, the explanatory power of the attribute cluster is often limited by the use of weighting factors in the cluster analysis. When weights are not used, the relationships are easy to see; otherwise, a significant amount of study and interpretation is required to derive meaning from attribute dendrograms.

The final graphical representation used in the current art is called a discrete contour plot. This plot is a rectangular array of the initial data, reordered from top to bottom to correspond with the order of the object dendrogram, and reordered left to right to correspond to the order of the attribute dendrogram. The initial object data is usually replaced by a color scale, or this plot can be generated as a three dimensional surface representation where the heights indicate the magnitude of the data values. Along with the dendrograms, this plot supports exploratory browsing of the data and clusters. Meaningful interpretations can sometimes be made by looking for islands or bands of color. FIG. 3 shows a complete analysis using a gray scale for the data in FIG. 1.

The gray scale contour plot of FIG. 3 helps to explain the object and attribute clustering that appears on its borders. The grouping of Ford and General Motors is readily understood, for example, by the large band of white space that they both share, covering the attributes of Gross Income, Cash, and Total Assets.

The invention described herein provides a method of displaying multidimensional data in a manner that depicts the actual spatial relationships between objects. The current art achieves a similar goal through a process called multidimensional similarity analysis. This practice uses mathematical techniques to arrange points on a two or three dimensional plot, such that the points represent objects in space and their arrangement approximates the spatial relationships of the actual objects. The graphical representation scheme, method of creation, and usability of multidimensional similarity analysis and this invention are very different however.

Cluster analysis as practiced in the current art is a mathematically robust technique for arranging objects and characteristics. It is very good at revealing complex multidimensional relationships to the human eye. It is less successful at its primary statistical purpose, which is the classification of the objects into a set of distinct groups. The classification problems are well documented in the literature, and often involve arbitrary divisions, empirically derived weighting factors, overlapping categories, and ad hoc abandonment of outlying data.

To illustrate these stubborn cluster analysis problems, imagine for a moment the Milky Way as viewed from the Earth. Cluster analysis could be applied to this view, where the objects are stars and their characteristics are X, Y, and Z dimensions in space or azimuth, altitude, and distance, to use Earth-centric measurements. In this case, however, we don't need cluster analysis because we can see the Milky Way. The relationships between stars are visually apparent. Yet we encounter difficult challenges if we want to group the stars into clusters. There are pairs of stars close together, triplets nearby, fuzzy clouds of stars embedded in constellations, pairs that only appear close together, long streams of stars containing smaller groups, et cetera. In short, there are groups at all sizes and scales, forming a continuum. Human perception recognizes groups, but these groups are defined based upon the purpose of the moment. Cluster analysis, lacking a purpose, cannot define a single all-encompassing grouping scheme.

These grouping problems only grow worse with increasing volumes of data. Today's relational database technology does not yet approach the millions of stars in the Milky Way, but it does support tables with hundreds of thousands of objects, each with dozens to hundreds of attributes. Information of this kind forms a continuum of objects and characteristics, it cannot be classified via a single model. Further, classification may obscure important relationships that may pique an investigator's interest. The very fact that a continuum, or spectrum, of values relates one group to another may be an important insight.

In FIG. 2 we elected to cut the cluster at a distance of 11, yet the selection of that particular distance is highly problematical. The literature describes a number of heuristic methods for selecting a cutting distance, but none are satisfactory in all, or even most, cases.

Thus, the visualization techniques of cluster analysis are its most important contribution, and the deterministic categorization techniques are less valuable. The current invention extends these visualization capabilities of cluster analysis, while eschewing its problematic categorization methods.

Multidimensional similarity (MDS) analysis provides a method of locating objects on a flat, or three dimensional plot, where the arrangement of the objects shows the associations, proximity, and geometric clouds or manifolds formed by the objects in multidimensional space. This technique, like the invention described herein, suffers from the distortion generated when higher dimensions are reduced to two or three. In practice MDS has little practical value when more than 50 objects of six or more dimensions are displayed because the plot becomes a confusing mass of points and object labels. Exploration of such a plot through computer interactive techniques—including rotation of the plot, projection onto a plane, and slicing at different levels and angles—helps comprehension, but only to a very limited extent. The methods of multidimensional similarity analysis cannot cope with hundreds of objects and dimensions, nor do they simultaneously display the attributes of each object as the invention described herein does.

The raw data for a cluster analysis is often provided by a relational database. The term relational has two separate meanings in this context: 1) It describes the relationship between the objects in a table and the characteristics of the objects. For example, as with FIG. 1, a table may contain companies as its objects, and financial characteristics of the companies as its fields, i.e., gross income, investment in R&D, inventory, long term debt, etc. The relationship here is that each object 'owns' the characteristics in its record. 2) The term relational also defines the connections between the tables in a database. For example, one table may contain industry sectors, such as, energy, technology, medical instruments, etc., and the companies in the sectors and another may contain companies and their financial characteristics. These tables have a parent, sector,—child, company, relationship.

As just described, the fields or columns of a table are related to the object defined in the first column, and the tables of the database are related to one another. Significantly missing from the relational scheme is a way to relate records or objects in a table to one another. In the current art, records or rows are typically inserted or returned via query in arbitrary, or random order, or ordered by the time they were initially created. A meaningful order is often applied to the records at the time of the query, usually involving alphabetic or numeric sorting of the objects or the values in one or more fields. The information in FIG. 1 is a good example. It is sorted in ascending order based upon the Sales in the prior 12 months. No other relationships are reflected in the order of the companies or their financial data.

While sorting is informative and useful for very specific purposes, this method of relating records to one another is primitive compared to a complete analysis such as cluster analysis that simultaneously considers all of the object characteristics.

A general purpose relationship between the records can only be achieved with a multivariate approach. Such methods—including cluster analysis, discriminant analysis, analysis of variance, and multidimensional similarity analysis—are regularly used in statistical fields, but are not yet a standard part of the relational database technology.

The problem of understanding the content of large tables of data grows more significant as technology provides methods to quickly insert and update thousands of records. Large quantities of untapped knowledge are hidden in these tables simply because querying, sorting, reporting, and browsing techniques do not satisfy current needs. The current art obscures the meaningful content through a variety of practices, including the use of abbreviated attribute names, and little or no documentation of the legal range of values of the characteristics. Often, only the database designer has sufficient knowledge of the structure and content of a relational database to construct a proper query. Those with the most to gain from study of the information in a database, i.e., administrators, scientists, managers are often unable to explore it in a meaningful way.

SUMMARY OF THE INVENTION

One object of the invention is to transform the records within a selected relational database into a standard three dimensional, ordered, graphical, reviewable representation of the database relationships. Another object is to convert the records to present the relational data in a two dimensional display format. A further object is to convert the records to present the relational data in a three dimensional display format for review as for example on a virtual reality computer allowing rotation and review of all surfaces for understanding of the relationships of the object sampled and represented.

In accordance with the description presented herein, other objectives of this invention will become apparent when the description and drawings are reviewed.

BRIEF DESCRIPTION OF THE DRAWING

FIG. 1 illustrates an example of data gathered regarding companies and weighting factors used in the description of the preferred embodiment example.

FIG. 11 illustrates a flow diagram of the invention.

DESCRIPTION OF THE PREFERRED EMBODIMENT

The present invention transforms a standard cluster analysis or other organized set of data into a data set for real or virtual three dimensional mapping of the information in the preferred method on a computer display for the user to discern object relationships. It does so by additional conversion of the standard cluster analysis products and displaying a graphical representation that supports a new level of information exploration.

Figure 2:
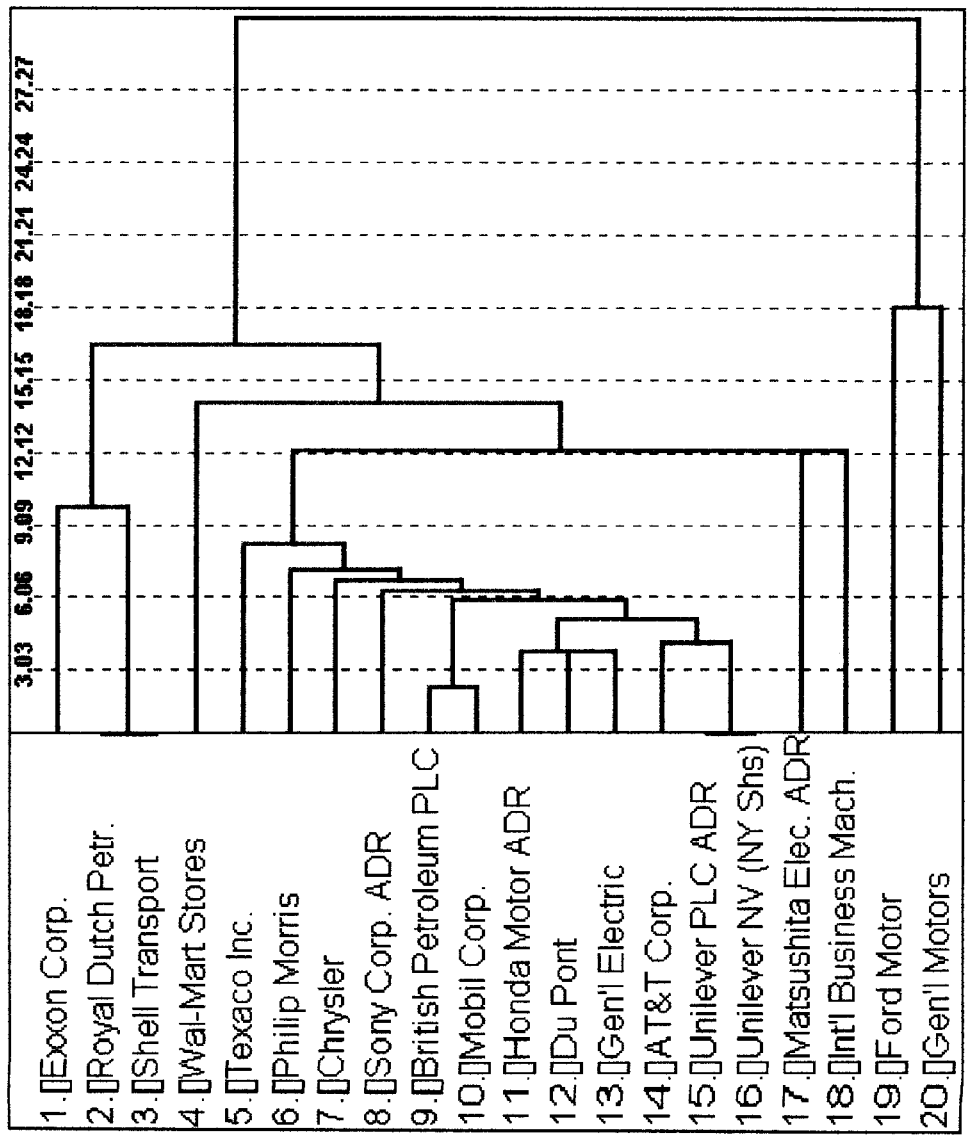
FIG. 2 illustrates a current art method of relational organization of the data in FIG. 1.
Figure 3:
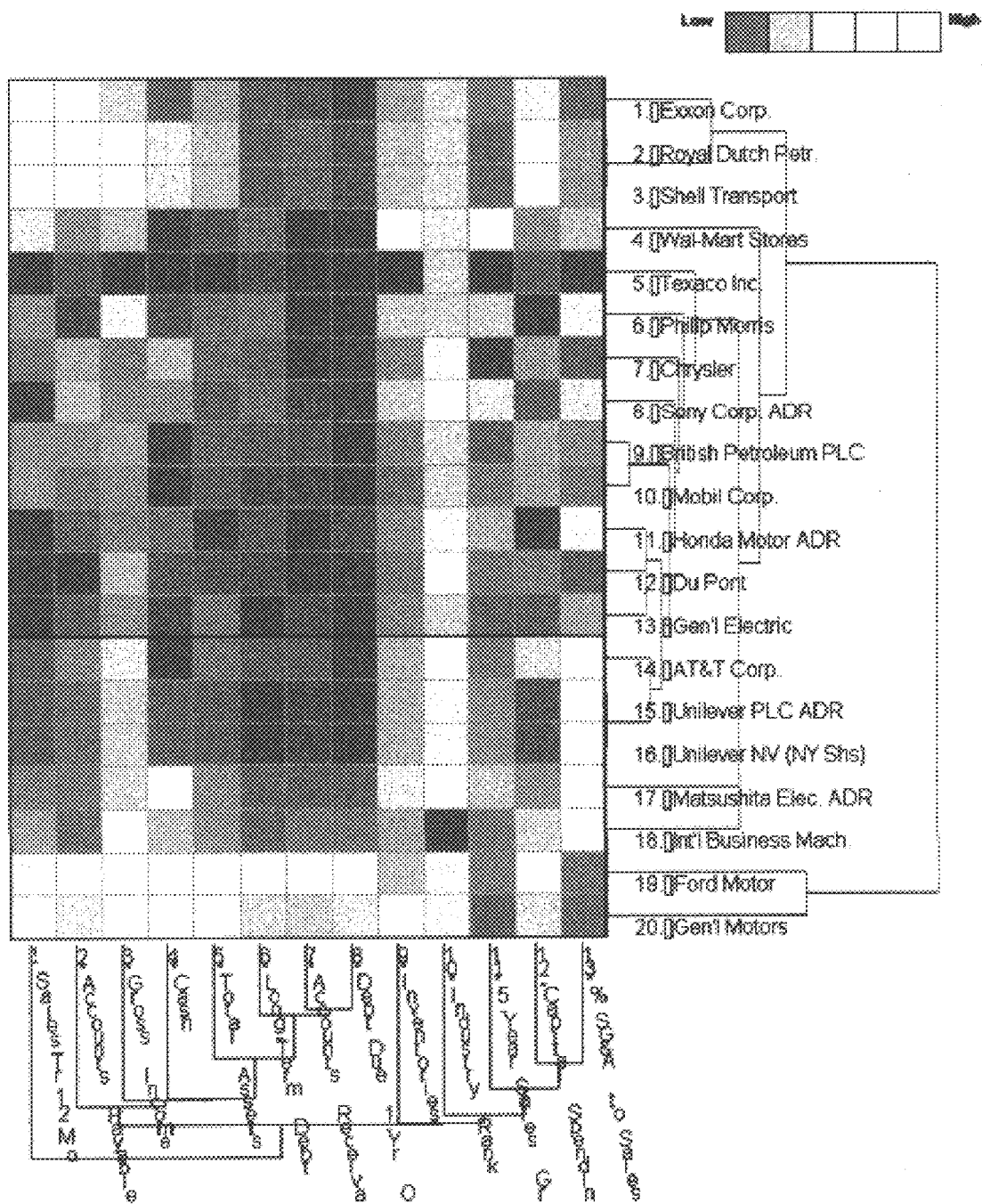
FIG. 3 illustrates a current art graphical gray scale representation of the relationship of the data in FIG. 1.
Figure 4:
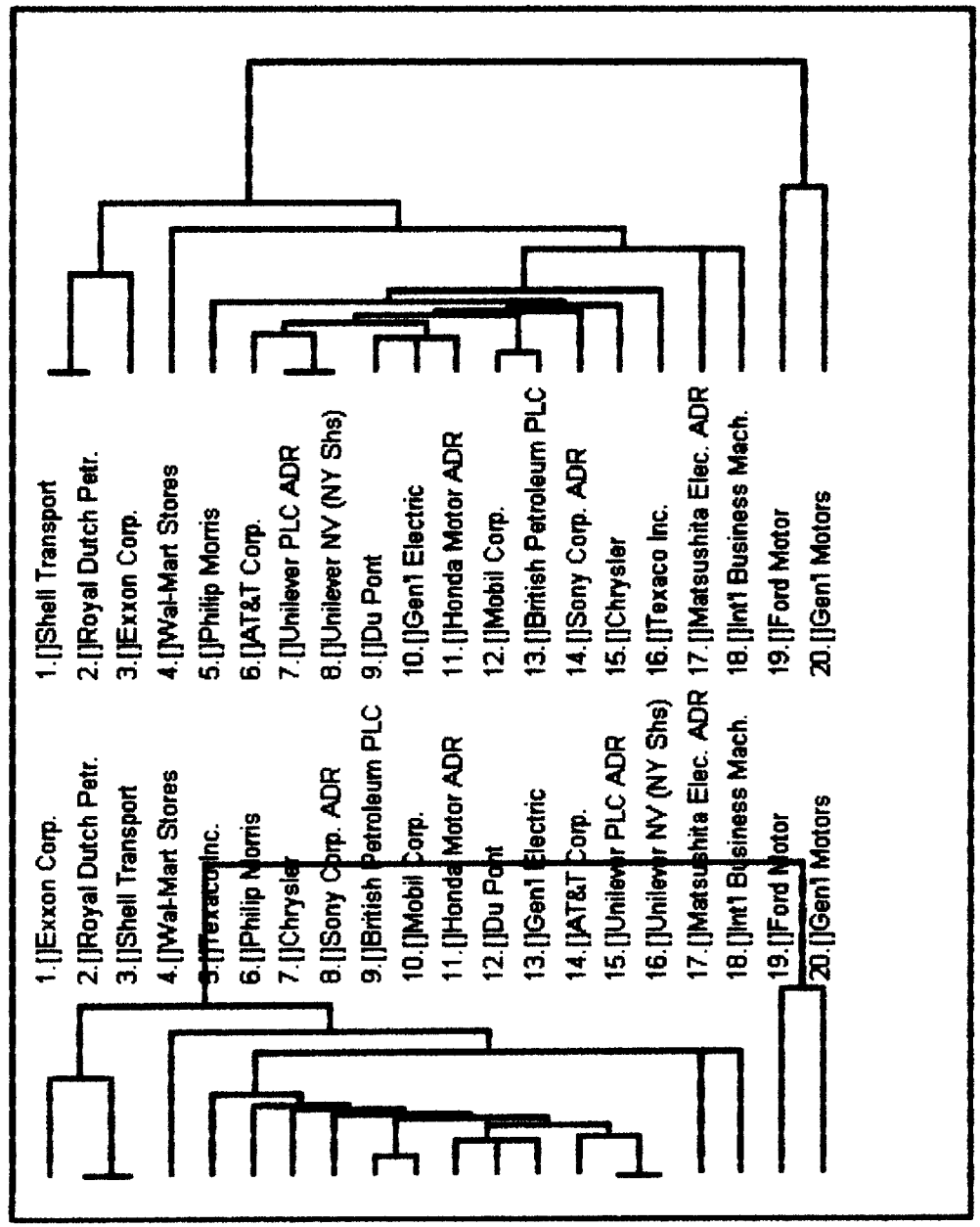
FIG. 4 illustrates two equivalent object dendrograms of the data used in the preferred embodiment example.

Referring to FIGS. 1 through 5 and 11, in FIG. 4 is presented two equivalent object dendrograms. A review of these results of the data organization indicates the exact same relational characteristics because the groups and distances are the same, and only the manner of presentation differs. Some of the objects have simply switched places in the presentation. Notice for example that Mobil and British Petroleum have switched places.

The vertical position of each object in the dendrogram however does influence the appearance of the discrete contour plot. As illustrated in FIG. 3, the contour takes its order from the arrangement of the object and attribute dendrograms. Thus, the first conversion performed in the current invention is to rotate the objects and attributes with the specific purpose of reducing the distance between neighboring objects in other groups. In FIG. 4 the groupings of the two dendrograms are identical, but the neighbors of each object are not. On the left side, for example, Wal-Mart has Shell Transport for a neighbor, while on the right side it has Exxon for a neighbor. This invention experimentally rotates each group in turn to find neighbors that are more similar to each other. The similarity measure may be the same distance measure that was used for the original clustering, or any of the other standard measures. The result is a lower energy contour plot. The blocks and bands of color in a mapping display become more consolidated on average, forming larger, more condensed islands of common values.

The detail steps of the condensation process are quite simple in their implementation. Referring to FIG. 11, the process begins by working with the smallest groups and proceeds to ever larger groupings. The members of a group are experimentally flipped or reversed in order within the clustering using the selected criteria. When this step is performed for a group of two, the objects exchange neighbors. When this step is performed for larger groups, all of the objects in the group retain the same neighbors, except the objects at the top and bottom edges. These edge objects are the only ones that experience a change in their neighborhood; in fact, they exchange neighbors in the adjacent groups. Both of these objects retain their original neighbor within their group, so only one neighbor changes for each. If the total distance between the edge objects and these new neighbors is less than the total distance between the objects and their old neighbors, then the group rotation remains, otherwise it is discarded.

The process is implemented from the smallest groups to the largest groups in performing the condensation process. At each group level, rotations are performed in multiple passes, until no more can be performed. Then the next largest group level is processed. Because the changes on the larger group level may create a potential for further rotations at a smaller group level, the process repeats the operation until there are no additional group rotations at any level that achieve a lower energy state.

Figure 5:
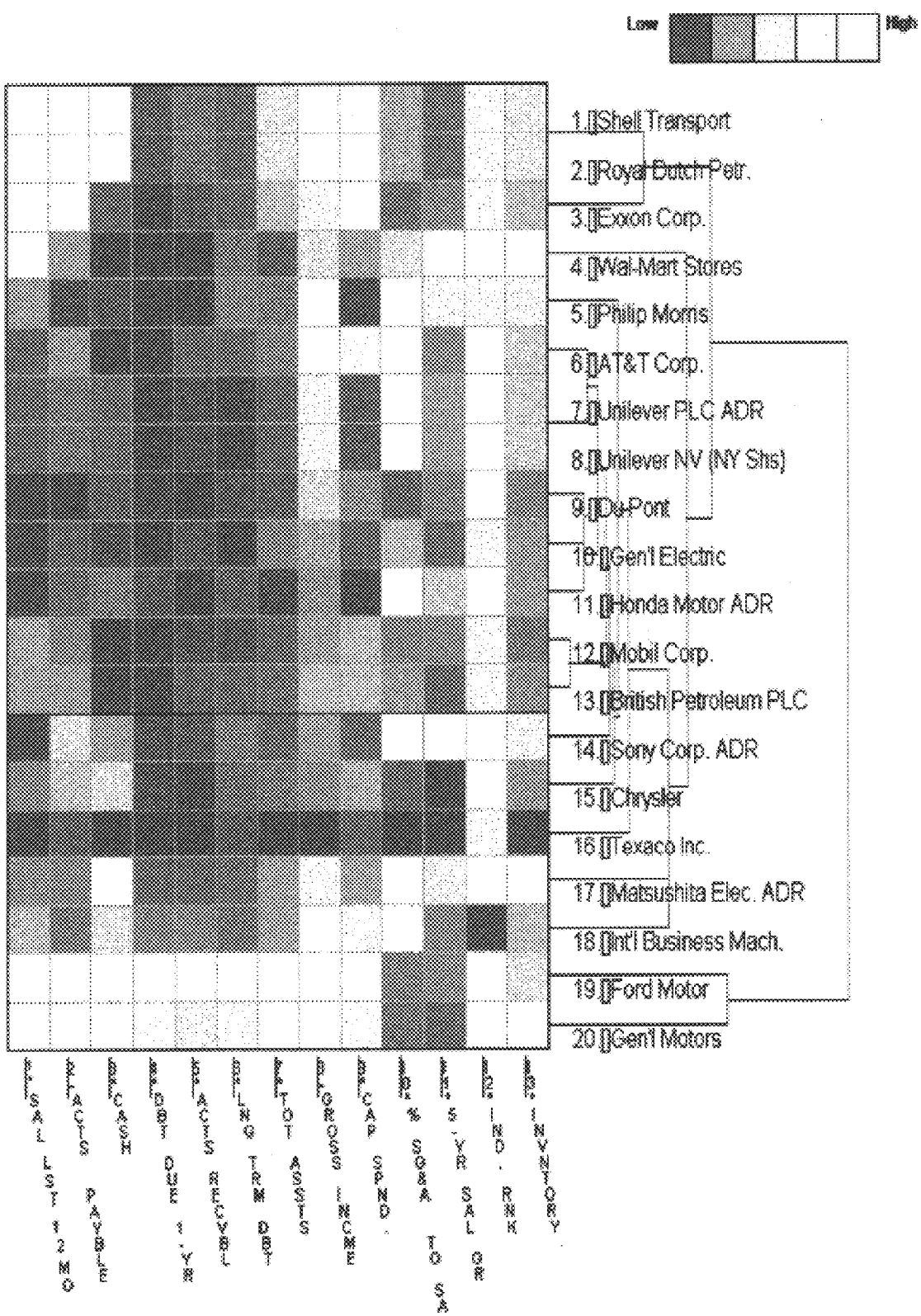
FIG. 5 illustrates a contour plot or map of the condensed data.

The result of this condensation process is illustrated as a contour plot or map in FIG. 5. In this simple example, some detailed study of FIGS. 3 and 5 may be required to appreciate the consolidation of colors, but note for example that the black squares representing Sales in the prior 12 months for DuPont and General Electric stand in a vertical black band of 3 elements or cells in FIG. 3, whereas they are part of a larger group of 4 black squares or cells in FIG. 5. The contour plot has become more informative.

The invention accomplishes the condensation without creating boundary problems by assuming that the top and bottom objects are neighbors, and that the right and left attributes are neighbors. During the condensation process this invention transforms the vertical arrangement of objects into a boundaryless, circular, or cylindrical based representation. In the example of FIG. 5, Exxon, originally positioned at the top of the dendrogram, has lost its position in the condensed version. The company has new neighbors that are more similar to it than in the original representation.

This same condensation process is performed on the attributes of the data set representing the objects. When this process is complete, the invention has imposed a circular, or closed-loop order upon both the objects and attributes.

Figure 6:
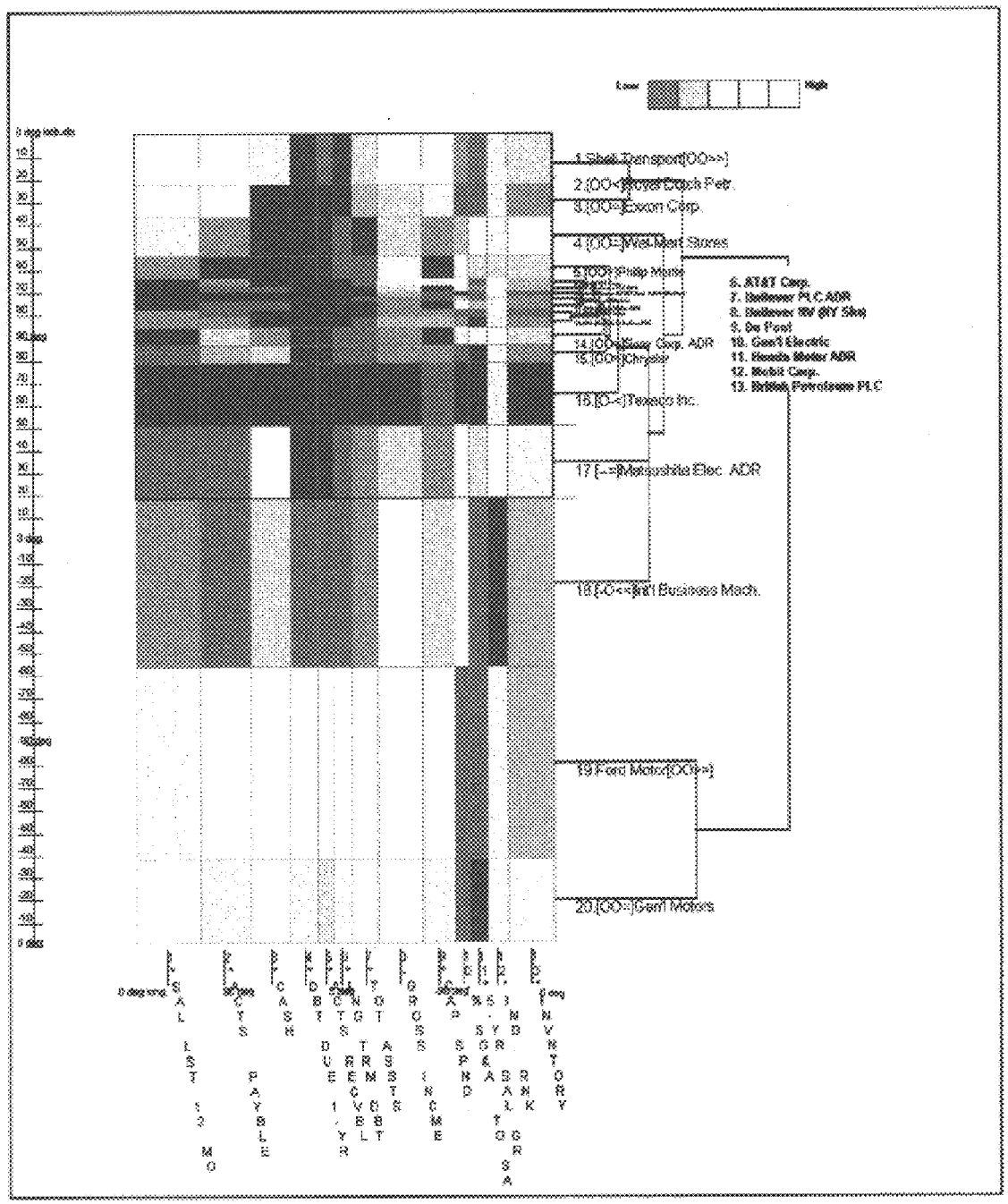
FIG. 6 illustrates a contour plot representation of the transformed scaled and condensed data with labeling.

Referring to FIGS. 6 and 11, the discrete contour plot representation is still incomplete for total information content in that it shows every object and attribute with the same cell size. Because at this point the process has just arranged the objects in a circular order, it can now adjust the cell sizes to better represent the proximity of objects to one another. So, the invention applies global scaling to the elements of the discrete contour plot. Each cell in the plot is made larger or smaller based upon its proximity to its neighbors as a total proportion of the proximity of all objects to their neighbors. The total difference between all neighboring elements becomes the circumference of a circle, and each cell is expanded or contracted to represent its portion of the whole.

The results of this scaling process are displayed in the scaled contour plot representation in FIG. 6. In addition to the consolidation of color that was achieved through rotation of the cluster objects, the distances between objects are now objectively displayed. The companies that are similar to one another appear closer together on the contour plot and those that are unique appear widely separated from the others.

While the display of the process results in the map of FIG. 6 which is an improvement over the current art, two limitations exist in such a display of the transformation results. First, the size of an object's cell is adjusted based upon its proximity to its two nearest neighbors. The object may be much closer to one neighbor than the other, yet the map hides this information. To overcome this display limitation, a simple annotation or labeling may be used along with the shading. Symbols placed with the data identifiers, the object name and attribute, such as, an = sign used to show that the object is approximately equally spaced between its neighbors may be used. The > symbol may likewise be used to indicate a neighbor if the object is twice as close to it as it is to the other neighbor. Similarly the >> symbol indicates a neighbor if the object is three times as close to it as to the other neighbor. A sample designation scheme is as follows;

= used if neighbors approximately equidistant

> used if prior neighbor is greater than 1.5 times distance to next neighbor and symbol appears to point to next neighbor >> used if prior neighbor is greater than 2 times distance to next neighbor < used if next neighbor is 1.5 times distance to prior neighbor << used if next neighbor is 2 times distance to prior neighbor Use of this scheme is illustrated in FIG. 6, for example, IBM is between Matsushita Electric and Ford Motor Co. The << symbols next to IBM are oriented toward Matsushita Electric, and by observing the gray scaled attributes one can see that it is indeed more similar to Matsushita Electric than to Ford Motor Co.

The values of 1.5 and 2 in the above example are arbitrary and depend on the data analyst parameters. In particular this invention allows setting by the user the values to multiples of the standard deviation of the object distances. In many statistical analyses, a value of one and two or two and three standard deviations is considered significant, so the > and >> symbols can be used to indicate these points.

The second limitation in the display of the data concerns the side by side representation of objects that are still very different from one to the other. The circularization that the process performs is a lumpy one because, as with MDS, it is not possible to smoothly represent multidimensional information in three dimensions. In some cases the characteristics of neighboring objects trend smoothly into one another, and in others they represent abrupt transitions. In the existing art of cluster analysis frequently these abrupt changes are indicated using a distance measure called the angular separation between objects. This measure changes suddenly in multidimensional analysis when one object has one or more large magnitude attribute changes relative to another object. The measure is used by the process of this invention to detect and indicate these abrupt borders. The symbols L, - - and O may be used to signify abrupt, intermediate, or smooth transitions between the prior and subsequent neighbors of each object.

To implement this in the process for display and analysis purposes, it is known in the art that the cosine between two objects, j and k, with n attributes of value X is given by:

$$c(ik) = \frac{\sum_{i=1}^{n} X(ij)X(ik)}{\sum_{i=1}^{n}(X(ij))^{2^{1/2}} \sum_{i=1}^{n}(X(ik))^{2^{1/2}}}$$

This invention calculates the average cosine between each object and its two nearest neighbors. It then examines each object and its neighbors and sets the symbols to indicate greater or lesser angles between neighbors, relative to the average. The process is summarized below:

- - used if separation angle approximately equal
- O used if separation angle to prior object is less than 0.5 times average separation angle
- L used if separation angle to prior object is greater than 1.5 times average separation angle
- O used if separation angle to next object is less than 0.5 times average separation angle
- L used if separation angle to next object is greater than 1.5 times average separation angle The symbols for the prior and next objects may be placed adjacent to each other, next to the object name as illustrated in FIG. 6. For example, Texaco has the symbols -L. The - indicates that the angular separation between it and Chrysler, the prior object, is not especially interesting, whereas the L indicates the angle between Texaco and Matsushita Electric, the next object, is unusually large. To visualize these angles, the analogy with the Milky Way is apt. The angle of separation between the Texaco star and the Matsushita star would be very large, implying that the viewer's eyes would have to span a large gap in the Milky Way between the stars.

As with the calculation for distances, the values of 0.5 and 1.5 in the above algorithm are arbitrary and can be changed. In particular this invention allows setting the values to multiples of the standard deviation of the angles. In many statistical analyses, a separation angle of two standard deviations is considered significant, so the L symbol can be used to indicate this breakpoint.

This process has created the equivalent of a flat projection of a lumpy spherical map or globe. It is now a map rather than a contour plot. Distance across the array of colors has meaning that it did not have before.

An example comparison between the existing art and the current invention illustrates the importance of distance. Imagine cluster analysis applied to the diagnosis of disease, where the objects are the diseases and the attributes are the symptoms, family history information, and test results associated with each disease. In medicine there are many situations where precise diagnosis is not possible, or where additional testing is based upon the current best guess. In the other art, a contour plot could be used to reach a tentative conclusion, but the relationship of diseases on adjacent rows would not be obvious. In order to include or exclude these diseases, a practitioner would have to exhaustively examine each of the symptoms in the diseases of the adjacent rows. However, the invention described herein gives a tangible value to distance over the surface of the map. If the adjacent diseases are closely packed together, they are very similar to each other, and might represent alternate diagnoses. If, on the other hand, the adjacent diseases are greatly separated then they are in fact very different in symptoms from the one being considered. In addition, diseases that are widely separated and include an L symbol between them are significantly different, probably with respect to several attributes. This relationship pertains throughout the map, so the further you move from the tentative disease, the less likely are the candidates.

A similar distance relationship holds for the attributes, although the weighting factors that are used in the analysis often confuse the picture. Because of the circular, scaled nature of the result, the invention includes a degree scale. Even though the map is lumpy, it is still useful to refer to relationships in terms of degrees. In FIG. 6, the companies located at +90 degrees and –90 degrees, on the vertical scale located along the left side, are separated by 180 degrees. Ford and Mobil are at opposite poles of the model. They are antipodean and, as made apparent by the gray scale cells, differ significantly in most financial characteristics. Another example of antipodean companies would be Texaco and Shell. In a similar comparison, two companies that are separated by 90 degrees are about as much alike as they are different.

Figure 7:
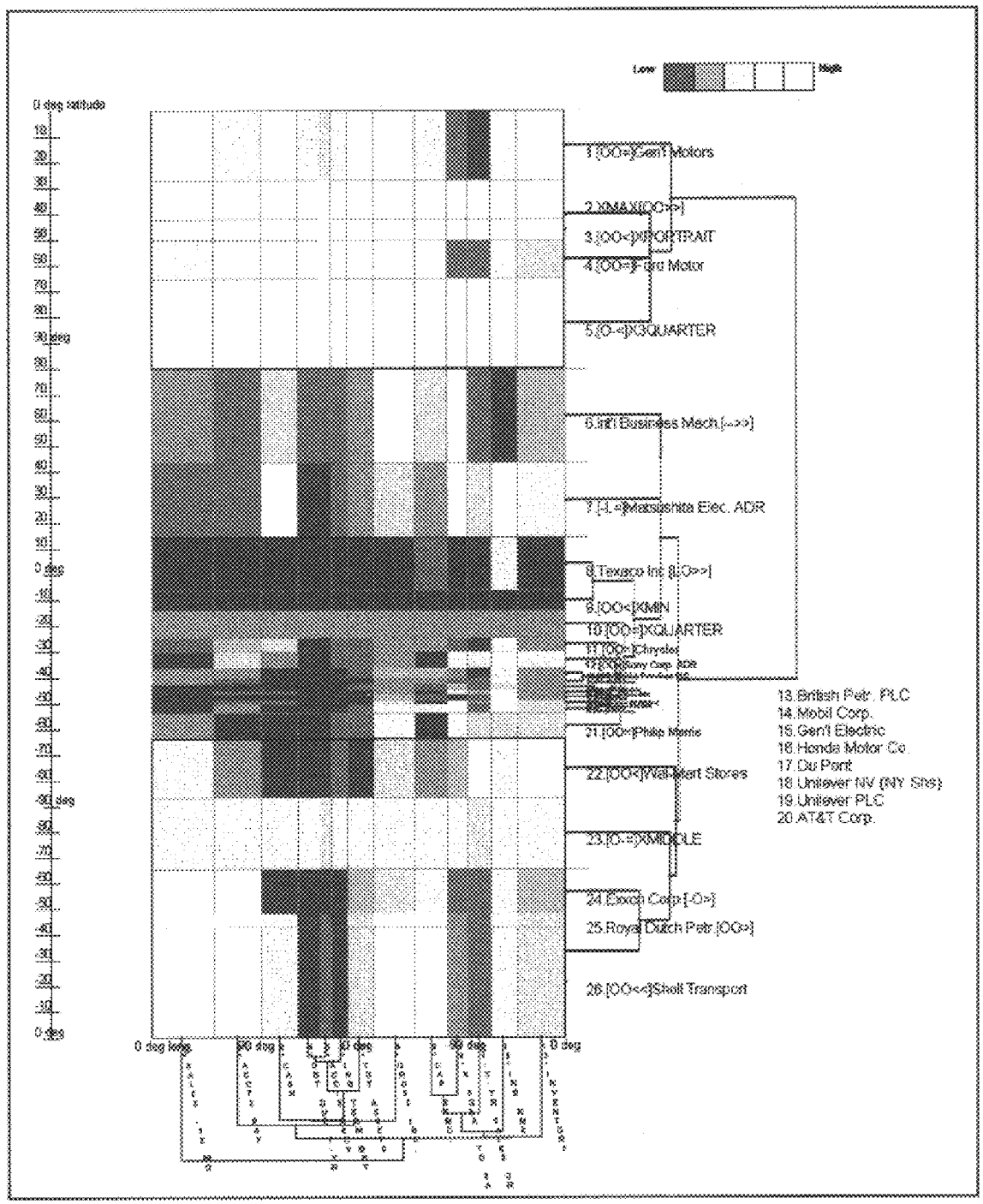
FIG. 7 illustrates a contour plot representation with imaginary objects inserted in the data.

This invention also provides for further enhancement of the degree scale by the addition of imaginary objects. Referring to FIG. 7, imaginary, X objects, have been inserted during development of the map. The maximum and minimum objects are created by extracting all of the largest and smallest attributes, respectively, from the other, real objects. These objects establish an absolute scale for the map. In a multidimensional sense they are located at the furthest corners of the attribute space and all of the real objects must fall between them. These objects define a hyperdiagonal line through the center of the model. Additional middle, quarter, and portrait objects are included.

The portrait object can be used to insert a desired or goal state for the real objects. For example, the Industry Rank attribute that has been included in the examples is actually an inverted measurement, where lower values are better. The value of one indicates the best rank. The portrait object can be defined to account for inverted attributes or ones where median or other values represent the goal object.

The imaginary objects are subjected to condensation and global scaling along with the other objects. As shown on the map, these objects clarify the distance relationships. It is instructive to compare the data present in FIG. 1 with the information map of FIG. 7. In one case we have a confusing array of numbers, and in the other we have a visual display of company financial information where the sizes and relationships almost jump off the display.

The invention has been used to create several complex models. An optic nerve disease model was generated using approximately 9,000 data points, a mineral habitat model was constructed using more than 15,000 data points, and a blood disease diagnosis model was developed using more than 62,000 data points. Each of these models resulted in a readable map of the domain and led to useful insights into the subject matter. Compared to statistical abstractions and queries of portions of the data, these models have the advantage that they graphically represent all of the information for user analysis and diagnosis.

Figure 8:
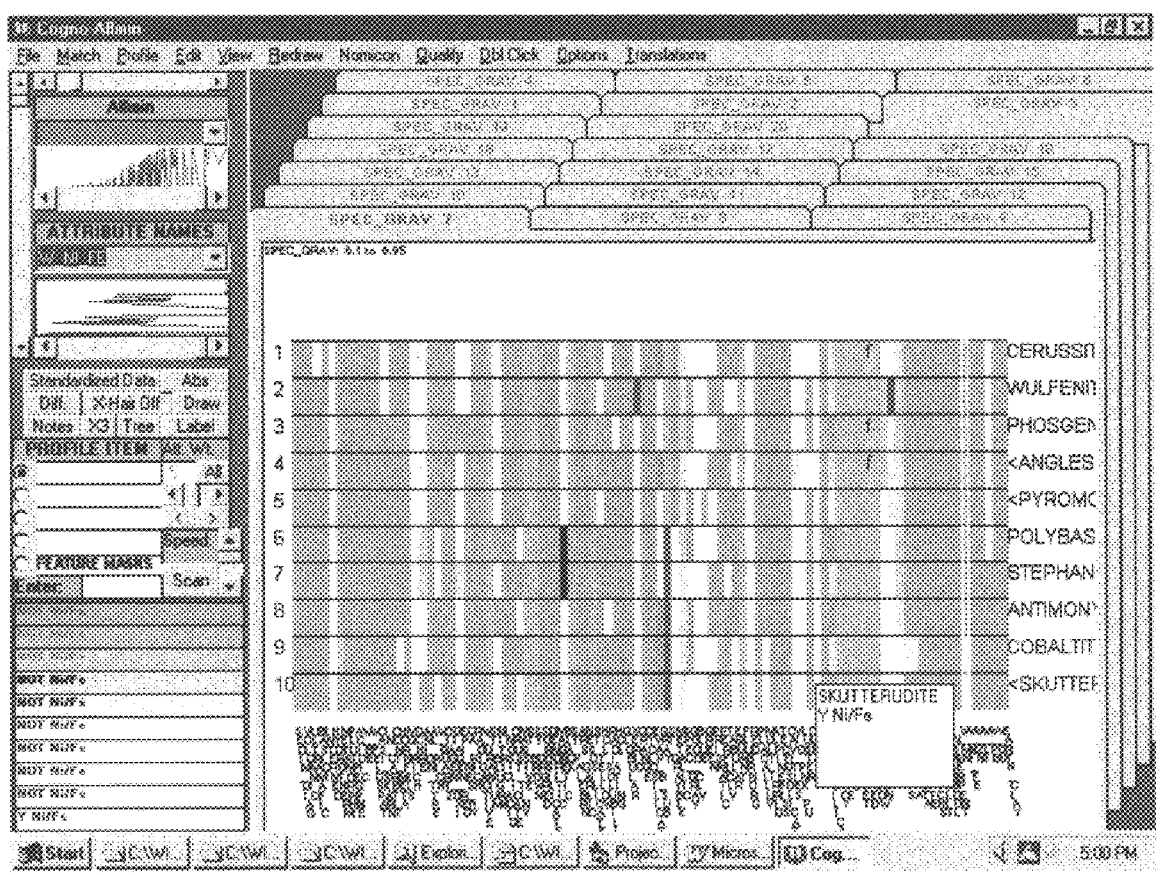
FIG. 8 illustrates a contour plot representation of a portion of a transformed data set.

The advantages of the mapping presentation are enhanced by viewing it in real time on a computer screen. Computer video allows the map to scroll beyond the borders of the screen. It also makes available such features as object locators, and hot spots over the surface of the map that instantly show the object name, attribute name, and value. FIG. 8 illustrates an example of a mineral habitat model sliced into separate tabs based upon the specific gravity of the mineral. The figure also shows the hot spot readout of values for a particular mineral, Skutterudite, and attribute, association with Nickel/Iron deposits, as the cursor moves over its location.

The invention is also applicable to multidimensional scaling (MDS). During the development of an MDS plot, the eigenvalues of the data are calculated. The first two eigenvalues are used to define a plane, and all of the multidimensional objects are then projected onto this plane, forming a flat MDS rendering. In a three dimensional MDS, the third eigenvalue is also calculated, and the objects are them projected onto a three dimensional surface.

The representation transformed by this invention is mapped on flat projections of roughly circularized information. This projection can be place upon or wrapped around circular objects in the same way that maps of the world are wrapped around a globe. Real models can be constructed in this way, but current computer technology and power allow these models to be developed in virtual reality as well.

Figure 9:
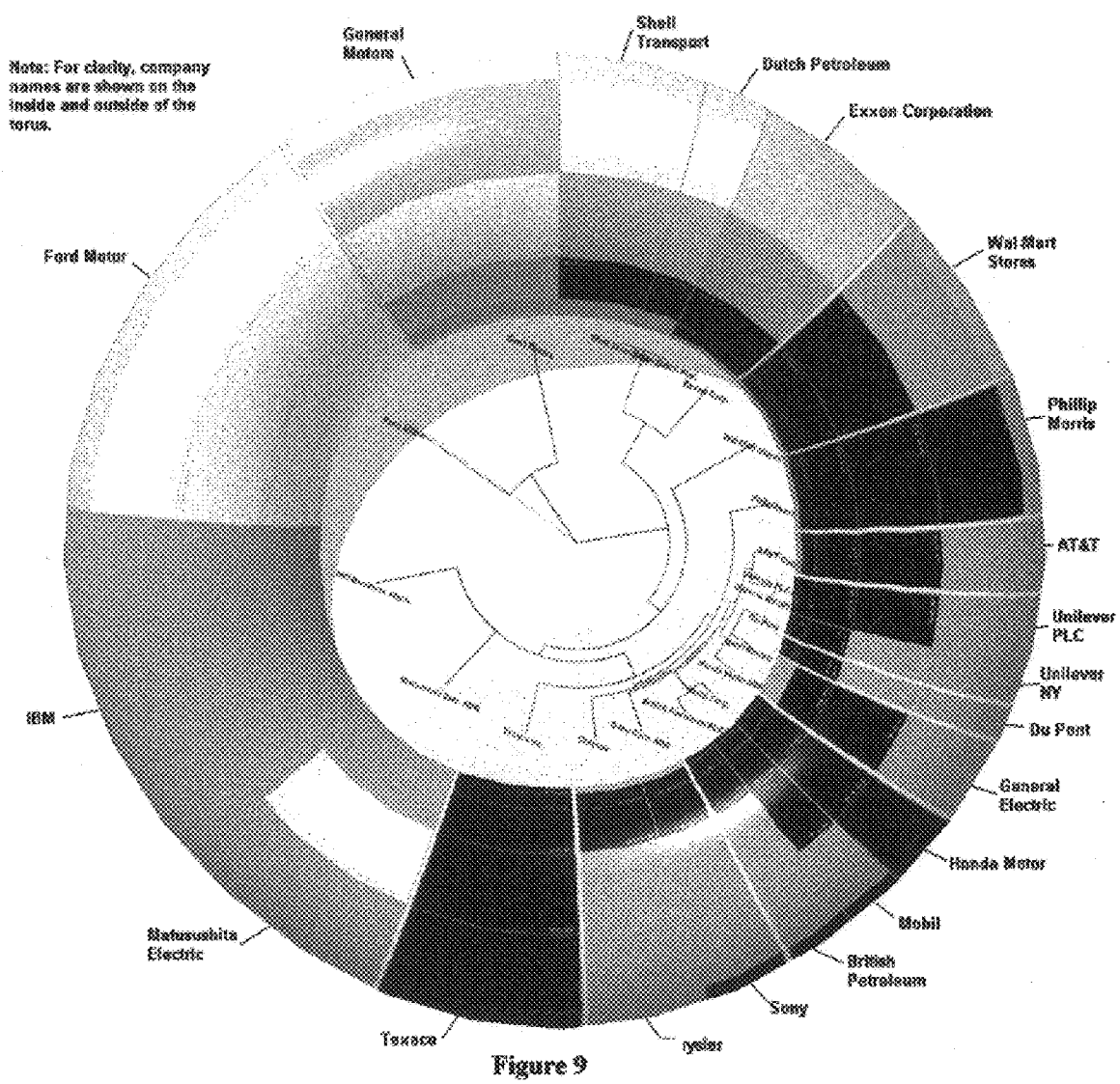
FIG. 9 illustrates a contour plot wrapped around a torus.
Figure 10:
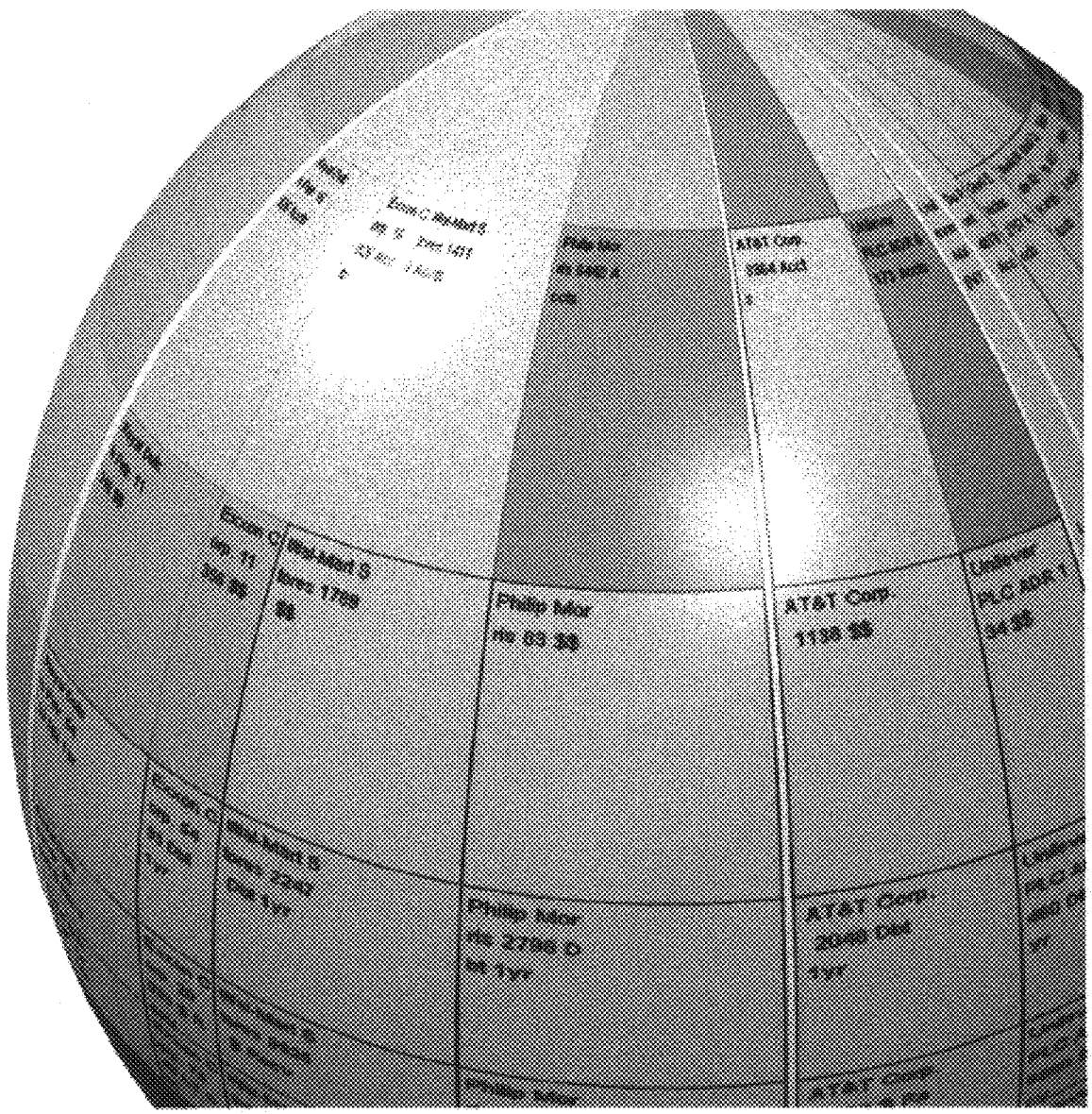
FIG. 10 illustrates a contour plot wrapped around a sphere.

Several different shapes lend themselves to information modeling. The map can be wrapped around a cylinder such that the top and bottom objects touch. Placing two cylinders side by side where each is based on different attributes would graphically define differences between the two evaluation techniques. The converse wrapping around a cylinder of the attributes so the attributes touch each other directly is also available. If both wrappings are performed, a torus or donut is the end result. The torus appears to provide the most realistic representation of the model in three dimensions. FIG. 9 shows a representation of FIG. 6 as wrapped around a torus. FIG. 10 illustrates part of the same model rendered as a sphere.

A sphere may also be employed for wrapping, although the result creates significant distortion at the poles. In cases where hundreds or thousands of objects are modeled, an alternative to a cylinder is also useful. By twisting the cylinder into a helix, the vertical height of the model can be reduced. When two cylinder models are placed side by side, the twisted result would be a double helix. The exact angular separations between objects can be used to portray a three dimensional object spanning more than a full 360 degrees. Since many more than three dimensions, or attributes, are commonly employed in these models, typical angular ranges can be many hundreds or thousands of degrees, for example, the model which has been used herein spans 852 degrees. A preferred way to represent this span is through a spiral that has multiple turns. The information on a row of the spiral would be the color coded attribute values as in the rows of the maps already presented. The distance, number of turns or partial turns, between the objects would be realistically portrayed on the spiral object. Once again, since this invention circularizes the model, the two ends of the spiral may be connected. It is believed the use of this structure represents the first time Euclidean distance and angular separation have been employed simultaneously to define the form of a clustering model.

I claim:

1. A process for transforming object information into a relational data set which may be displayed, comprising the steps of:

ordering a plurality of objects according to a defined set of attributes into a plurality of groups;

rotating each group with a plurality of neighbors, beginning with a smallest group and proceeding to a largest group, ordering the groups relatively for a smallest distance between neighbors;

scaling each group proportionally to a distance to each neighbor;

comparing the distance relatively between the two neighbors which are nearest and labeling the object with distance information;

calculating an average cosine of an angle between the two neighbors which are nearest;

comparing the average cosine relatively between the two neighbors which are nearest and labeling the object with the angular distance information; and placing the objects rotated and scaled with labelling information on a display.

2. The process as in claim 1 further including the steps of:

creating a plurality of imaginary objects on the basis of the attributes; and inserting the imaginary objects with the objects to be ordered.

3. The process as in claim 2 wherein the imaginary objects are based on the attributes maximum and minimum values.

4. The process as in claim 1 further including the step of creating a two dimensional display of the objects rotated and scaled with labeling information.

5. The process as in claim 1 further including the step of creating a spherical display of the objects rotated and scaled with labeling information.

6. The process as in claim 1 further including the step of creating a toroidal display of the objects rotated and scaled with labeling information.

7. The process as in claim 1 further including the step of creating a helical display of the objects rotated and scaled with labeling information.

8. The process as in claim 1 further including the steps of;

repeating the steps of claim 1 for a second defined set of attributes; and comparing the objects rotated and scaled with labeling information.

* * * * *